Oct. 10, 1950   N. J. RODMAN   2,525,725
METHOD OF SURFACE TREATING GLASS CONTAINERS
Filed Oct. 25, 1947   2 Sheets-Sheet 1
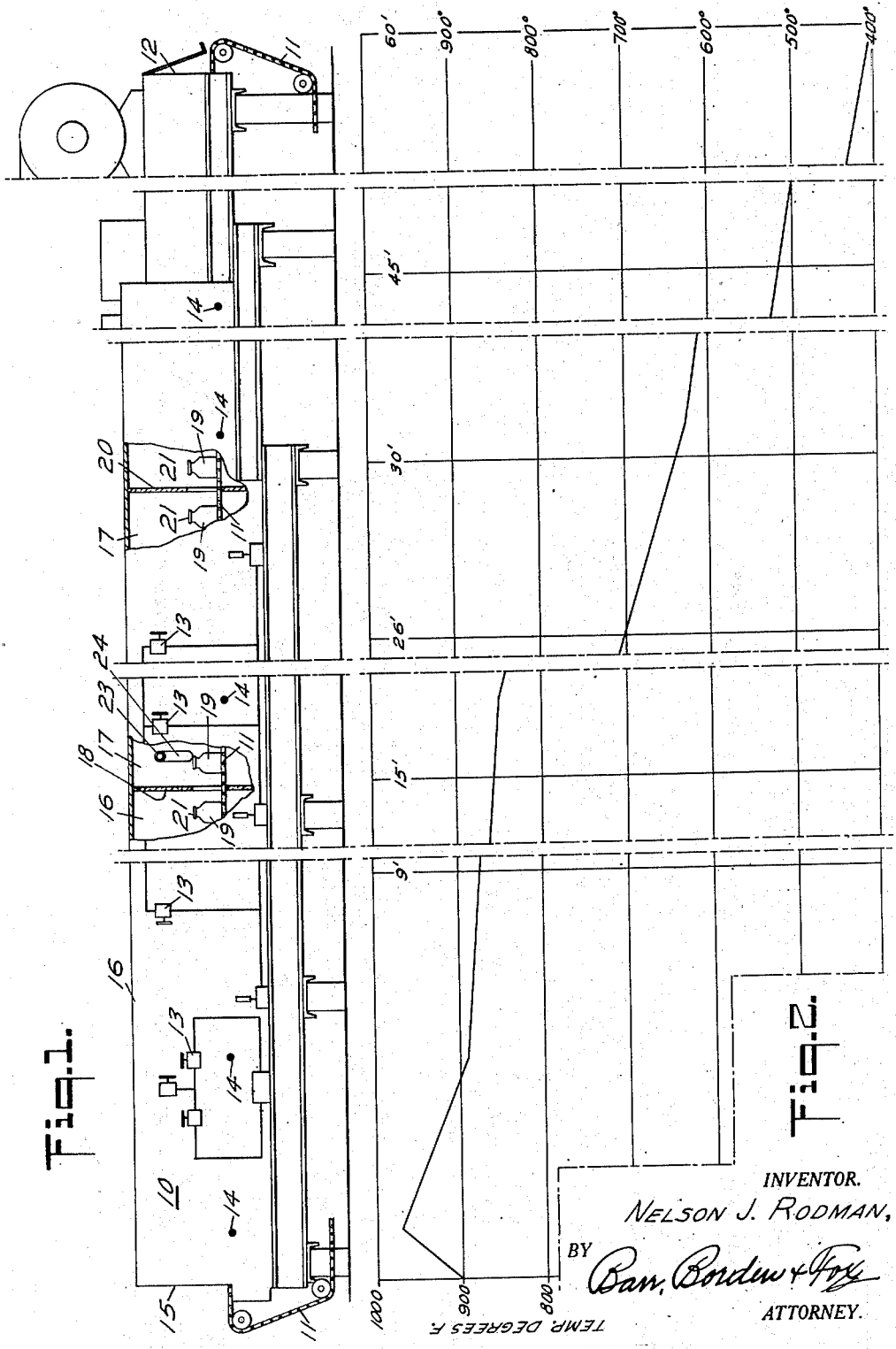
INVENTOR.
NELSON J. RODMAN,
BY
ATTORNEY.

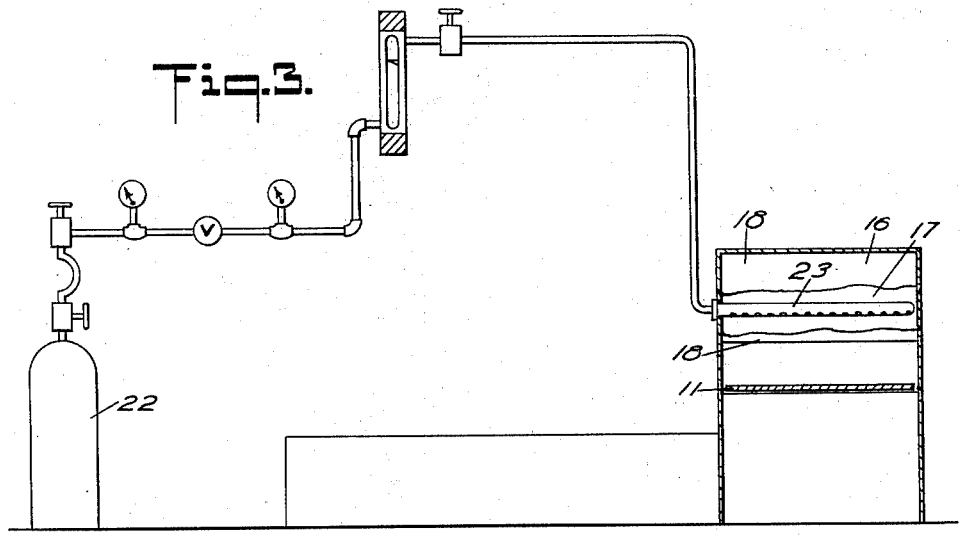
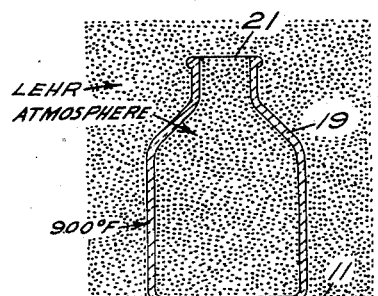
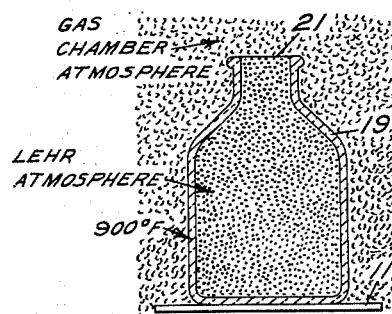
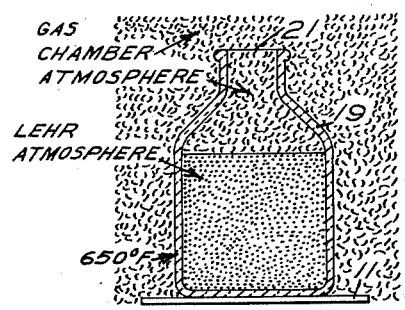
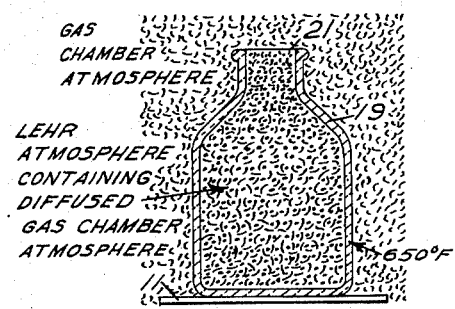

Patented Oct. 10, 1950

2,525,725

UNITED STATES PATENT OFFICE 2,525,725

METHOD OF SURFACE TREATING GLASS CONTAINERS

Nelson J. Rodman, Bridgeton, N. J., assignor to Wheaton Glass Company, Millville, N. J., a corporation of New Jersey Application October 25, 1947, Serial No. 782,140

1 Claim. (Cl. 49—77)

This invention relates to the surface treatment of glass containers, and particularly to the treatment of the interior of glass bottles, jars, or other containers.

It has long been recognized that alkali, such as sodium, tends to concentrate on surfaces such, illustratively in connection with the present invention, on the interior surfaces of bottles and jars of certain types of glass, the presence of which decreases the durability of such surfaces and represents a dangerous situation, especially when the containers are used for certain types of contents, as, for instance, illustratively in the pharmaceutical or biological fields, as the sodium has a deleterious effect on the packaged contents. On the other hand, it is also well known that when an acidic gas, such, for instance, as sulphur dioxide ($SO_2$), is brought into contact with such alkali-rich surface under proper conditions of heat, the alkali combines with the acid radical to form a water soluble compound, which, with the illustrative materials involved, would be sodium sulphate. This compound is water soluble at a rapid rate and to a high degree, so that subsequent washing of the bottles or containers with water removes all traces of the compound and provides an inner surface of the bottle as an alkali-deficient veneer possessing a lower chemical reactivity compared to the bulk of the glass.

The effort to translate the knowledge of the above phenomena into practical commercial practices has not, however, been simple or easy, nor has it been free from criticism of various kinds. The methods and apparatus for attaining the final internal alkali-deficient veneer have been many and various. One typical prior art procedure involves the placing in the respective individual bottles of a batch of bottles, of individual pellets or like small masses of a solid which under the influence of heat fuse and vaporize as a gas within the respective bottles. This not only requires scrupulous care in the placing of the pellets in the bottles to insure that one or two or more of a large number of bottles has not been missed, as well as a final careful check of the finally treated bottles for the same purpose, with the constant hazard that despite such checking, there may from time to time be sent out bottles which are allegedly or supposedly treated to remove such surface alkali, but which actually are not in the supposed category. It also requires apparatus and equipment for subjecting the bottles containing the pellets to the vaporizing heat required, with consequent large increase in equipment and operating costs. However, the demand for such bottles remains high and the dropped pellet has largely superceded other methods of administering the gas to the interior of the bottles, so far as understood of other practices in the field.

In all of the practices of the past with which applicant is familiar, added operating and equipment costs were almost inevitable, which in certain instances amounted to such increases as to make the costs of producing the treated bottles almost prohibitive.

It is among the objects of this invention: to provide internal treatment of bottles with acidic gas with a minimum waste of the gas; to provide a method of interior treatment of bottles with acidic gas such as $SO_2$ which uses the standardized conventional bottle making and annealing methods and apparatus only, with a mere slight change in the annealing lehr; to provide a method of treating the interior of bottles with $SO_2$ without danger of omitting any bottles from the treatment; to provide an alkali-neutralizing treatment for the interior of bottles operative during the standard annealing process for the newly formed bottles; to reduce the costs of surface alkali-neutralization of bottles; to effect a positive control by aspirating an optimum predetermined amount of $SO_2$ in the chamber and controlling the inflow thereof so as to maintain such optimum concentration of $SO_2$ as at all times to attain a maximum of surface durability, i. e., surface de-alkalization, with a minimum gas flow, so as to preclude waste, and so said optimum de-alkalization of the glass surface is effective on all bottles subjected to the treatment without the hazard of occasional untreated bottles in series of supposedly treated bottles; to maintain a proportionate gas saturation in the gas chamber adequate to maintain optimum conditions and, illustratively, at 80% thereof; and other objects and advantages of the invention will become more apparent as the description proceeds.

In carrying out the invention in a preferred form, the molded bottle after molding passes into the pre-heating end of a substantially standard annealing lehr in which the annealing starts and is completed, with a portion of the lehr formed as a gas chamber located in the lehr behind the pre-heating chamber of the lehr and of appreciably smaller longitudinal extent than the complete length of the lehr, so that after the initial preheating of the bottle in the preheating chamber the bottle temperature has been reduced to approximately 900° F., having passed substantially, preferably, through the annealing point the advancing bottle enters the gas chamber portion where it is exposed to an atmosphere saturated with acidic gas, illustratively $SO_2$, and continues to be so exposed while the bottle temperature passes from the initial gas chamber temperature thereof of approximately 900% F. to a final gas chamber temperature thereof of substantially 650° F., during which the shrinkage of the gas in the bottle, of approximately 18%, draws in the gas saturated atmosphere through the neck and into the upper end of the bottle to a position in which by its rapid diffusion it, or a mixture of the saturated gas and the lehr atmosphere in the bottle, completely fills the bottle, and as by this time the bottle has passed completely through and beyond the strain point, the contained gas combines with and neutralizes the alkali either directly at the surface of the bottle or immediately adjacent thereto, after which in a continuation of its timed progress through the annealing lehr it is discharged in an annealed and relatively surface alkali-free condition.

In the accompanying drawings forming part of this description:

Fig. 1 represents a diagrammatic fragmentary side elevation of a conventional annealing lehr containing the gas chamber of this invention as a subdivision of the lehr, in which the treatment recited is performed upon the bottles in transit through the lehr, according to a preferred embodiment of the invention.

Fig. 2 represents a diagram of the lehr of Fig. 1, showing the heat ranges of the ambient atmosphere in the lehr at the various points longitudinally of the lehr and showing the location of the gas chamber in its relation to the relative temperatures within the lehr.

Fig. 3 represents a transverse vertical diagram of the lehr of Fig. 1, showing the gas supply and control and the mode of introduction of the gas into the gas chamber of the lehr.

Figs. 4, 5, 6 and 7 represent respectively progressive schematic vertical sections through one illustrative bottle in its progress through the lehr; in Fig. 4 showing diagrammatically lehr atmosphere inside and outside of the bottle in the preheating chamber of the lehr as the bottle progresses toward and is about to enter the gas chamber; in Fig. 5 showing the initial condition in the gas chamber as regards the external gas saturated ambient atmosphere in the gas chamber, and the different, substantially lehr atmosphere within the bottle, with the bottle at substantially 900° F., in Fig. 6, showing the secondary condition of the bottle in the gas chamber as regards the external ambient gas saturated atmosphere of the gas chamber and the partial penetration and extension thereof into the interior of the bottle prior to diffusion into the lehr atmosphere in the remainder of the bottle as the bottle temperature has continued to drop and approach approximately 650° F., and in Fig. 7 showing the internal diffusion and filling of the bottle with a mixture of lehr and the gas saturated atmosphere of the gas chamber before the bottle leaves the gas chamber in the final stages of its annealing movement through the lehr.

Referring to Fig. 1, a typical annealing lehr of the L type of an illustrative sixty feet in length is indicated at 10, and an endless conveyor 11 forms a traveling floor for the lehr upon which bottles are disposed and travel through the entrance 15 progressively through the lehr to discharge at the delivery end 12. Illustratively, the complete trip through the lehr requires two hours, as the bottles advance approximately a foot in two minutes. The lehr is provided with all of the essential apparatus to render it operative as an annealing lehr, including burners 13, preferably using propane gas or the like to control the temperatures in the lehr, aided by the thermally responsive control devices 14, disposed at suitable intervals throughout the lehr, and responsive to the ambient temperatures within the lehr.

For general purposes of description it may be considered that the lehr 10, of the illustrative sixty feet length, is divided into two halves, of which the last in the line of conveyor movement is a unitary and conventional last half of an annealing lehr, and takes no active part in the process involved herein except as a means to complete the gradual cooling of the treated bottles. The particular emphasis and description will be directed toward the substantially half front portion. This is comprised of two parts, one of which is a pre-heating chamber portion 16, in which the inwardly moving bottles 19 are exposed to an ambient atmosphere of atmospheric air plus perhaps some $CO_2$, to raise the bottle temperatures close to 980° or thereabout, pursuant to which, as the bottle moves rearwardly, the ambient temperature drops and the bottle temperature also drops until it has attained substantially 900° F. At this point, the bottle 19, through diffusion, has probably acquired an internal atmosphere which is substantially the same as the ambient atmosphere within the pre-heating chamber. This condition is indicated by Fig. 4. A gas chamber 17 is formed within the lehr in the rear part of the front end half portion of the lehr, substantially defined at the front thereof by the asbestos or like insulating curtain 18, closing off the lehr except for a small distance at the bottom wide enough to permit the transverse passage of upstanding bottles 19 on the conveyor 11, and closed at the rear end by a similar asbestos or like insulating curtain 20 having similar size and characteristics as front curtain 18. A plurality of bottles 19 having open mouths 21 mounted on the conveyor 11 can pass successively under the front curtain, through the gas chamber and under the rear curtain 20, and then through the remainder of the lehr in the completion of the annealing cycle.

In order to treat the cooling bottles with $SO_2$ gas, a bottle of $SO_2$ gas under high pressure, as 22, is led through suitable reducing and expansion valves to a diffusor pipe 23 vertically adjustable as in a suitable adjustably covered slot 24, as by a sliding baffle plate (not shown) within the gas chamber in the lehr, located preferably about a foot more or less behind the front curtain 18 thereof, and through which diffusor pipe 23 a sufficient quantity of the gas is diffused as to maintain an optimum concentration of $SO_2$ in the atmosphere in the gas chamber within the lehr. Illustratively, the gas concentration is maintained at approximately 80% saturation of the volume of the gas chamber. This percentage is not critical, in the sense that other proportions may not work after a fashion, but it is critical in the sense that approximately this proportion of saturation includes a satisfactory margin of safety to insure effective de-alkalization without appreciable or significant waste of the $SO_2$. Preferably the diffusor pipe 23 is adjustable vertically to a point such that the outlet apertures thereof are spaced approximately one-half inch from the mouth of the bottles.

Each bottle 19 enters the gas chamber at a temperature of approximately 900° F., and at this point the ambient gas-saturated atmosphere in the gas chamber surrounds the entire bottle 19, but, instantaneously at least, has not effected a penetration into the bottle, and the relative internal and external gas conditions are indicated in Fig. 5. In traversing the gas chamber, which requires about thirty minutes, the temperature of the bottle 19 drops until it is approximately 650°. During the change in bottle temperatures from 900° to 650° the initial contents of the bottle upon its entry into the gas chamber will have shrunk approximately 18%, and as the pressure throughout the lehr is substantially constant there will consequently be an appreciable volume of the acid saturated gas pass through the neck 21 of the bottle and into the upper end of the bottle adjacent to the neck, as diagrammatically indicated in Fig. 6. This penetration is facilitated by the known high specific gravity of the $SO_2$ over the air contained in the bottle. While actually there will continue to be diffusion of the acid-saturated gas into the bottle 19 as soon as shrinkage of the gas in the bottle becomes sufficient to cause penetration, the diffusion is expedited and facilitated and made more certain by the utilization of the gas shrinkage just recited, even though the schematic gas stratification indicated in Fig. 6 may never occur as a practical matter. It does occur in essence, and before the bottle attains the end of its travel in the gas chamber the saturated gas atmosphere has diffused thoroughly within the bottle as indicated schematically in Fig. 7.

As the ion mobility between the surface of the glass and the interior thereof is a function of viscosity, which in turn is a function of temperature, it will be appreciated that a controlling consideration for the efficient and economical practice of the invention is to subject the bottles to the gas saturated atmosphere when the temperatures of the bottles have decreased from a higher point so that the bottles have substantially passed the annealing point and so that the ionic mobility has become more sluggish, so to speak, further movement of alkali metal ions (sodium) from the interior of the glass towards the surfaces has substantially ceased. In other words, to save the acidic gas it is desirable and preferable to expose the gas to the bottle surface when the viscosity of the glass has risen appreciably from its more liquid state at higher temperatures.

The advantages and economies of the instant invention will be appreciated.

Having thus described my invention, I claim:

The method of treating the interior surfaces of open mouth bottles which consists in heating the bottles to a temperature of approximately 900° F. while maintaining a content of gas relatively inert to alkali in said bottles, introducing the bottles into a confined heated atmosphere mixed with a predominant volume of acidic gas, and lowering the temperature of the bottle to approximately 650° F., whereby the inert gas content of the bottle shrinks to draw the acidic gas mixture through the bottle mouth to diffuse with and dominate the inert content and neutralize alkali on the interior surface of said bottles.

NELSON J. RODMAN.

REFERENCES CITED

The following references are of record in the file of this patent:

UNITED STATES PATENTS

| Number | Name | Date |
| --- | --- | --- |
| 1,782,169 | Kamita | Nov. 18, 1930 |
| 1,809,534 | Tillyer et al. | June 9, 1931 |
| 1,933,529 | Wardley et al. | Oct. 31, 1933 |
| 1,973,501 | Murgatroyd | Sept. 11, 1934 |
| 2,056,207 | Piazzoli, Jr. | Oct. 6, 1936 |
| 2,203,182 | Rendall | June 4, 1940 |
| 2,241,511 | Greene | May 13, 1941 |